US006321484B1

(12) United States Patent
Zelinski, Jr. et al.

(10) Patent No.: US 6,321,484 B1
(45) Date of Patent: Nov. 27, 2001

(54) LASER OPERATED SEED POTATO CUTTER

(76) Inventors: William John Zelinski, Jr., P.O. Box 377, Plover, WI (US) 54437; Thomas Keith Tallackson, 771 Nebraska Ave. East, St. Paul, MN (US) 55106

( * ) Notice: Subject to any disclaimer, the term of this patent is extended or adjusted under 35 U.S.C. 154(b) by 0 days.

(21) Appl. No.: 09/365,981

(22) Filed: Aug. 2, 1999

(51) Int. Cl.[7] .................................................. A23N 15/02
(52) U.S. Cl. ...................................... 47/1.01 R; 426/237
(58) Field of Search ............................... 47/1.01 R, 58.1; 83/168; 219/121.68; 426/237

(56) References Cited

U.S. PATENT DOCUMENTS

| 3,096,801 | 7/1963 | Miles et al. ............................... 146/78 |
| 3,582,466 | * 6/1971 | Quirk .................... 162/286 |
| 4,358,467 | * 11/1982 | Patel ..................... 426/237 |
| 4,726,272 | * 2/1988 | Forney ................... 83/168 |
| 4,839,181 | * 6/1989 | MacMurray et al. ................. 426/237 |
| 5,106,637 | 4/1992 | Forwood et al. ..................... 426/237 |
| 5,170,698 | 12/1992 | Kirk ....................... 99/472 |
| 5,897,797 | * 4/1999 | Drouillard et al. ............. 219/121.68 |

FOREIGN PATENT DOCUMENTS 2654662   11/1989   (FR).

* cited by examiner

Primary Examiner—Charles T. Jordan
Assistant Examiner—Francis T. Palo
(74) Attorney, Agent, or Firm—Curtis V. Harr

(57) ABSTRACT

A method of cutting seed potatoes prior to their planting is provided in which a laser beam is employed to slice the potatoes into the desired sized pieces. The present invention employs a plurality of laser cutting tubes and/or a multiple laser beam horizontal cutting areas which hold laser beam generating systems made up of laser beam sources that project the laser beams through the center of the cutting tubes or the cutting area and laser energy absorbers which contains the laser energy not used in the cutting process within the confines of the body of the invention. The laser beams bisect the cutting areas and as a potatoes pass through it the laser beams effectively cut the potato into the desired size before it leaves the body of the present invention. Additionally, the use of a laser to cut seed potatoes prior to their planting also cauterizes the cut surfaces of the potatoes which ensures that any diseases contained within an individual seed potato will not be passed to additional potatoes during the cutting process.

20 Claims, 4 Drawing Sheets

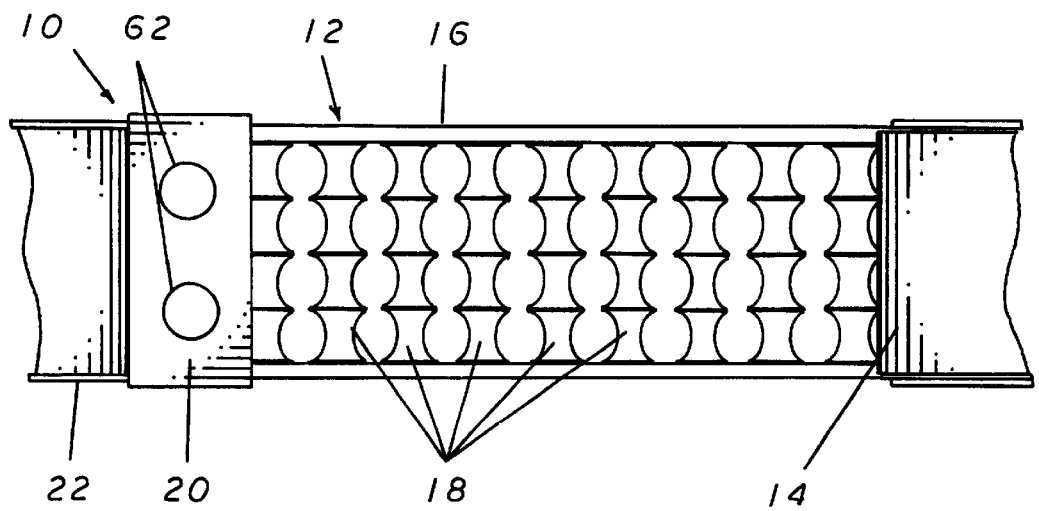
FIG 2
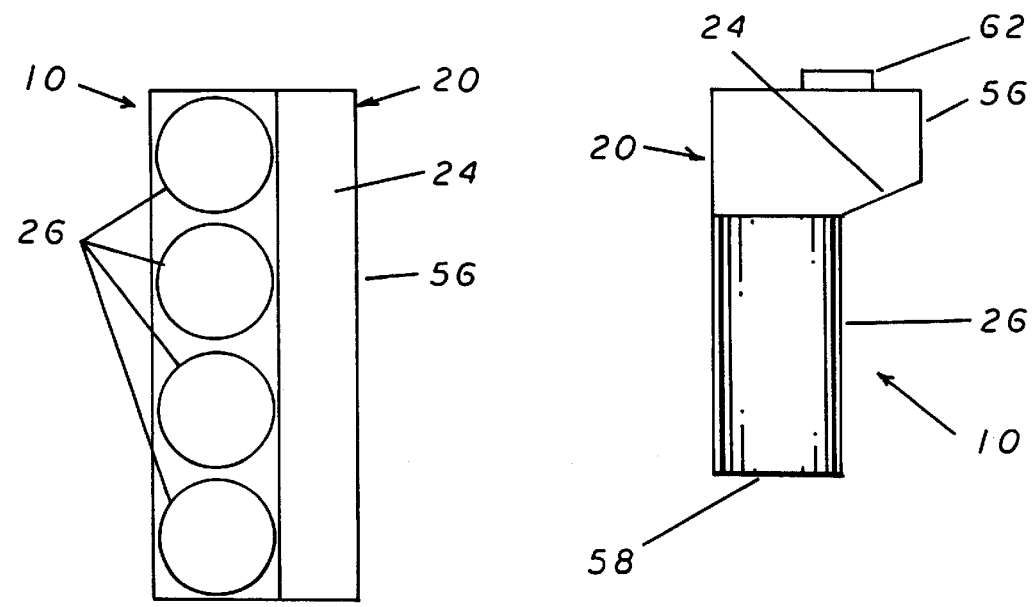
FIG 3
FIG 4

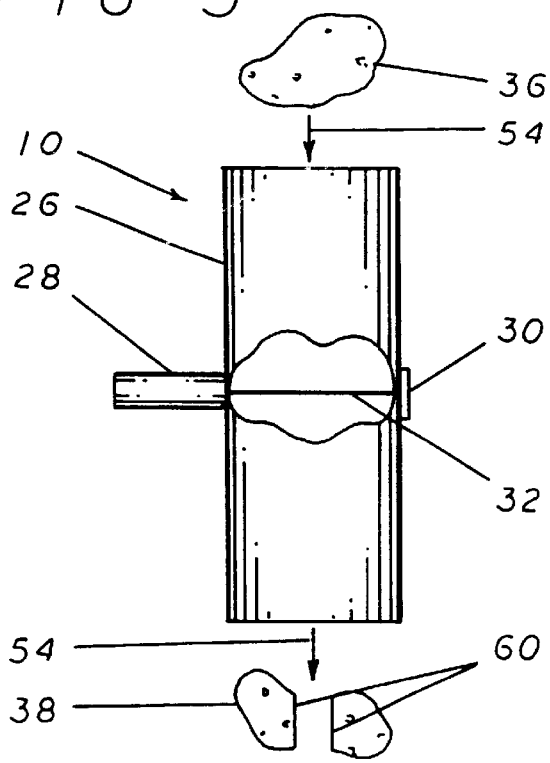
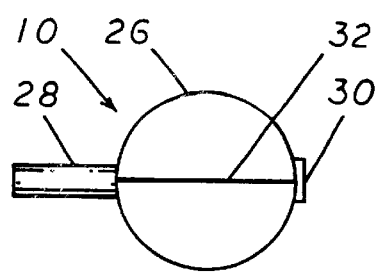
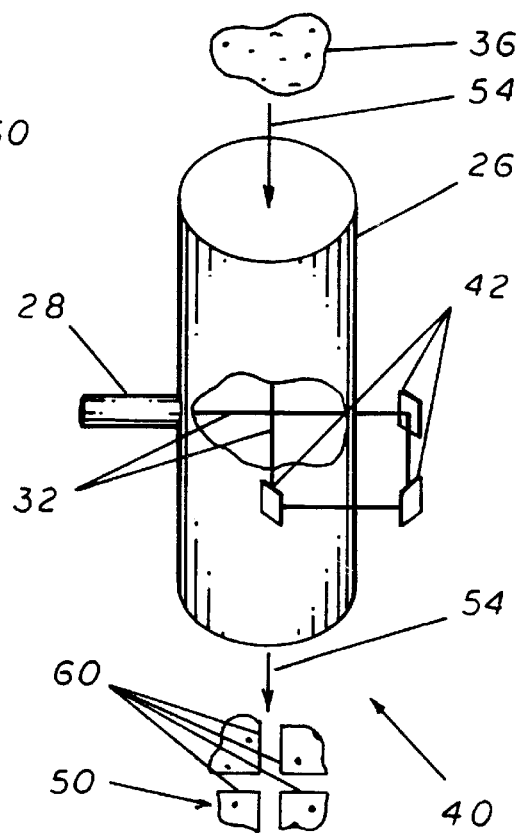

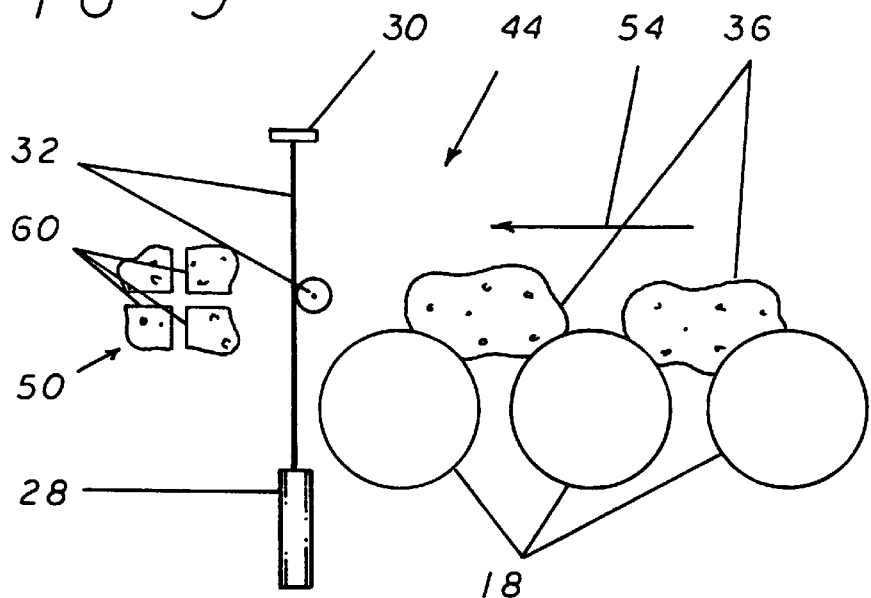
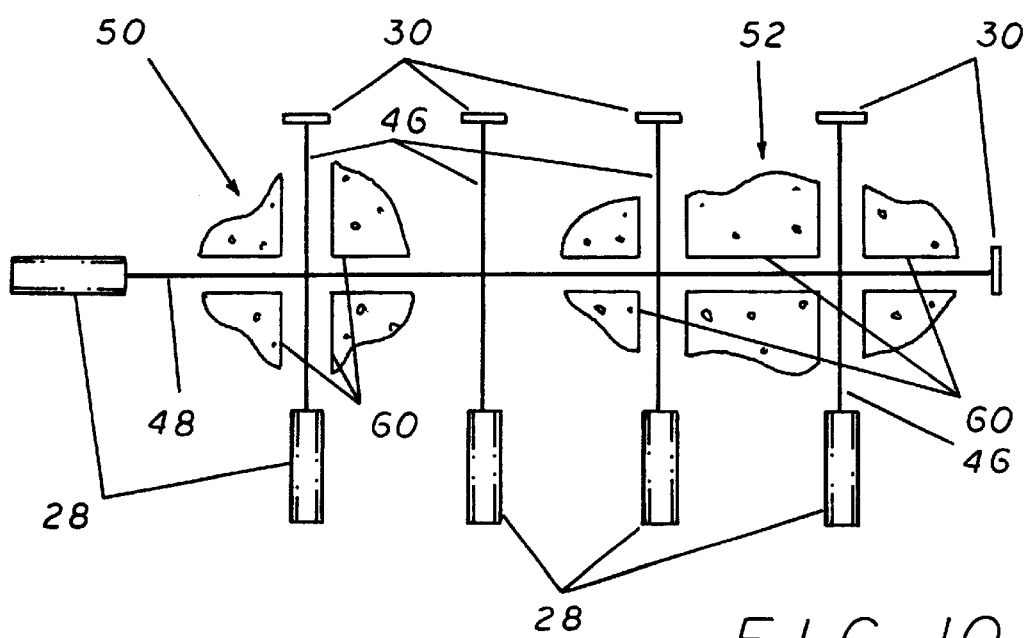

LASER OPERATED SEED POTATO CUTTER

BACKGROUND OF THE INVENTION

The present invention relates to an improvement in the method used to cut and plant seed potatoes during spring planting. More specifically, to a method of cutting the seed potatoes prior to their planting in a manner that ensures that the cut potatoes will not be contaminated due to the possible presence of bacteria and other pathogens that are common to and create problems in potato crops.

It is well known to cut and size seed potatoes in a variety of ways prior to planting. In the past seed potatoes have often been cut by hand with a common knife prior to planting. In the last twenty years large automatic seed cutters which still use a blade to cut potatoes have gained in popularity. One of the issues with the use of a blade to cut seed potatoes has been the spread of disease from one potato to the next. When a blade cuts a potato that is diseased and is subsequently used again without cleaning, the disease may be spread to the next few potatoes that are cut. One solution to this has been the use of chemicals such as a bleach solution which may be used to clean the knife blade between cuttings. Although this practice can be effective if done properly this practice is both time consuming and can be unreliable if the blade is not cleaned thoroughly. Further, the use of a cleaning solution is not practical with most large seed cutting apparatus and may only be effective when cutting seed by hand.

From this discussion it can be seen that it be desirable to find a method of cutting potatoes with a large commercial cutter and sorter that prevents the spread of disease from one piece of cut seed potato to the next.

SUMMARY OF THE INVENTION

It is the primary objective of the present invention to provide a method of cutting seed potatoes in such a manner that any bacteria or other pathogens that are present within a given seed potato will not be passed on to others by means of the cutting instrument.

It is an additional objective of the present invention to provide such a method of cutting seed potatoes that effectively cauterizes the cut surfaces of the seed potatoes to ensure that the transfer of pathogens from one potato to another does not occur either during or after the cutting process.

It is a further objective of the present invention to provide such a method of cutting seed potatoes that utilizes a contained high intensity laser beam to perform the cutting operations.

It is a still further objective of the present invention to provide such a method of cutting seed potatoes that can be easily used with existing potato cutting and planting machines that are common in the market place today.

These objectives are accomplished by the use of a laser cutter housing that can be fitted to the frame of a conventional potato cutter or built in as part of a specialized piece of equipment. This cutter housing contains a plurality of laser cutting tubes and/or a multiple laser beam horizontal cutting areas through which the seed potatoes pass, as are coming off of a series of rollers that are typically part of a conventional potato cutter. These rollers are used to move the seed potatoes to the actual cutting component of the machine and also to align and sort the potatoes prior to their entering the cutter housing. Once the potatoes enter the laser cutter housing and are cut by the laser beams, they drop, exit the invention, and fall onto the lower conveying apparatus which carries them away from the invention to a point where they can be handled by the equipment operator.

The type of laser used, its power source wavelength and power density or pulse energy type and degree of focus may be readily determined and varied by one of skill in the art. Different types of lasers such as carbon dioxide, argon or nitrogen may be used. The type of focus that is used may also be varied depending upon the circumstances encountered. However, all of these factors are known and may be taken into account by one of skill in the art. At this point, it may also be stated that many commercially available potato sizers may first be used prior to cutting the seed. The type of sizer and it's specific operation may be tailored to the growers requirements and tolerances. Further, the arrangement of the lasers may be varied to match the particular sizer being used.

The laser cutting tubes house a laser beam generating system which is made up of laser source which projects the laser beam through the center of the cutting tube and a laser energy absorber which contains the laser energy not used in the cutting process within the confines of the body of the invention. The laser generating system can be oriented in a variety of different configurations to obtain different types of cuts in the seed potatoes but, in its simplest configuration, a single laser beam is projected across the interior of the cutting tube. This bisects the cutting tube and as a potato falls through the laser beam, the potato is cut in half before it exits the invention.

The use of a laser cutting system to cut seed potatoes prior to planting not only provides an effective method to do so, but also eliminates one of the biggest problems associated with this process. When using a mechanical device to cut the seed potatoes prior to planting, any bacteria or other pathogens that are contained within an individual potato and that come into contact with the cutting instrument can easily be passed to additional potatoes that are subsequently cut. Thus, a significant percentage of the seed can be infected which can drastically reduce the ultimate yield of the crop. The use of the laser cutting system eliminates this problem as the heat generated by the laser beam cauterizes the exposed potato flesh. This cauterization of the cut destroys any pathogens contained within individual potatoes and ensures that other potatoes will not be infected. With this source of disease eliminated by the present invention, the ultimate yield of the crop being planted will be increased dramatically which will also increase the profits made on the crop.

For a better understanding of the present invention reference should be made to the drawings and the description in which there are illustrated and described preferred embodiments of the present invention.

DESCRIPTION OF THE DRAWINGS

FIG. 2 is a top elevation view of a typical seed potato cutter illustrating the manner in which the rollers are used to align and transport the potatoes from one side of the cutter to the invention.

FIG. 3 is a top elevation view of the internal components of the present invention showing the laser tubes into which the potatoes are fed for cutting.

FIG. 4 is a side elevation view of the internal components of the present invention showing the laser tubes into which the potatoes are fed for cutting.

FIG. 5 is a side elevation cut-away view of the cut tube component of the present invention illustrating the manner in which a potato is cut by the laser as it passes through the laser cutter.

FIG. 6 is a top elevation view of the cut tube component of the present invention illustrating the position of the laser beam within the cut tube.

FIG. 7 is a perspective view of an alternative embodiment of the present invention in which a set of reflecting mirrors are used to project a second laser beam through the cut tube to make multiple cuts in a potato that is passing through.

FIG. 8 is a top elevation view of an alternative embodiment of the present invention illustrating the position of the laser beams within the cut tube.

FIG. 9 is a side elevation view of a further alternative embodiment in which multiple laser beam sources are used to make multiple cuts in seed potatoes that are passing through the cutter.

FIG. 10 is a front elevation view of a further alternative embodiment in which multiple laser beam sources are used to make multiple cuts in seed potatoes that are passing through the cutter.

DESCRIPTION OF THE PREFERRED EMBODIMENT

Figure 1:
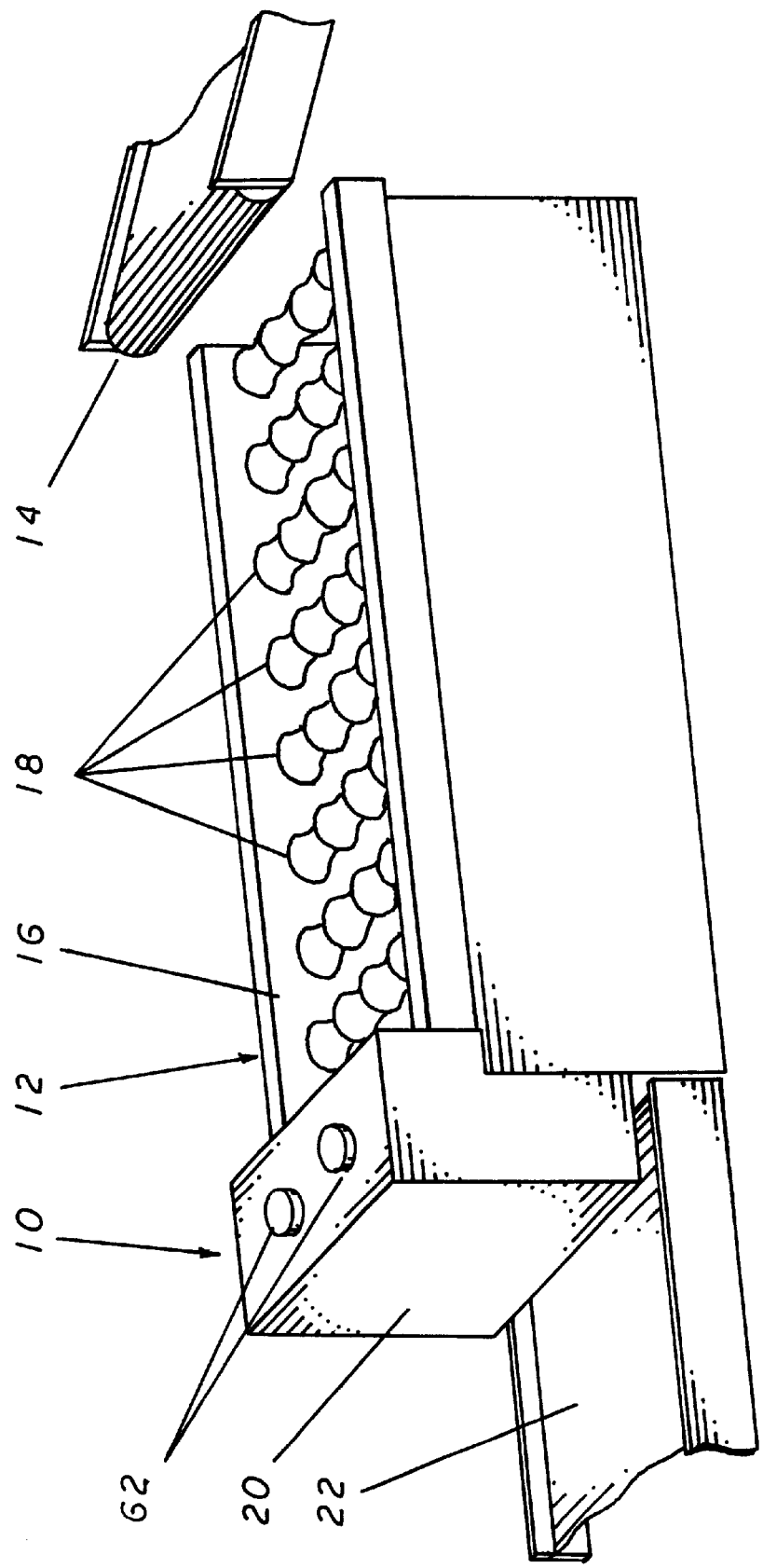
FIG. 1 is a perspective view of a typical seed potato cutting machine which may be used in conjunction with the present invention.

Referring now to the drawings, and more specifically to FIGS. 1 and 2, the laser operated seed potato cutter 10 may be used in conjunction with a typical seed potato cutting machine 12. The seed potato cutting machine 12 is available in a wide variety of configurations but most typically is made up of a substantially rectangular box cutting frame 16 which houses a plurality of rotationally driven alignment rollers 18. The alignment rollers 18 serve a variety of functions. The first of these is to move the seed potatoes 36 from the end of the cutting machine 12 at the point where they are deposited on the rollers 18 by the upper conveyor apparatus 14 to the laser cutter housing 20 located at the opposite end of the potato cutting machine 12. The second function of the alignment rollers 18 is to channel the seed potatoes 36 into discreet rows which are fed into the cutter housing 20. These discreet rows aid in the cutting process as they make sure that the seed potatoes are fed through the present invention one at a time which ensures that each seed potato 36 is properly cut. Finally, the rollers 18 also sort the seed potatoes 36 according to their size for purposes that are relevant to the present invention and that will be more fully discussed below.

Once the potatoes 36 have passed through the cutter housing 20 and have been cut by the present invention, they fall out the bottom of the cutter housing 20 and on to the lower conveyor apparatus 22. The lower conveyor apparatus 22 is located on the opposite end of the potato cutting machine 12 to the location of the upper conveyor apparatus 14 and functions to move the cut seed potatoes 38 to a point at which they can be removed from the apparatus by the operator. Thus, the present invention is employed by placing seed potatoes 36 and feeding them into the cutting machine 12 by placing them on the upper conveyor apparatus 14 which deposits them onto the alignment rollers 18 of the potato cutting machine 12. The rollers 18 align the potatoes 36 into discreet rows and sizes them by allowing small seed potatoes 36 to drop. The rollers 18 then transports the potatoes 36 to the laser cutter housing 20 where they are cut into smaller pieces and dropped on to the lower conveyor apparatus 22 where the process may be repeated depending upon the particular users need. The lower conveyor apparatus 22 then transports the cut potato 38 to a point where they are either stored for later use or immediately planted by a planting machine.

The primary method of construction of the laser operated seed potato cutter 10 is illustrated in FIGS. 3 and 4. The laser operated seed potato cutter 10 is made up of a laser cutter housing 20 which is located at the terminal end of a potato cutting machine 12. The seed potatoes 36 that are being transported, aligned, and sorted by the rollers 18 are fed into the cutter housing 20 through the cutter housing upper opening 56. Upon entering the cutter housing 20, the smaller sized seed potatoes 36 are deposited onto the feed platform 24 which is a downwardly angled shelf leading to the interior of the cutter housing 20. The angle of the feed platform 24 forces the potatoes 36 to slide deeper into the interior of the cutter housing 20.

Once the seed potatoes 36 pass over the length of the feed platform 24, they fall into one of the plurality of laser cutting tubes 26 which are used to cut the smaller sized potatoes 36 and which form the majority of the lower end of the cutter housing 20. It is within the laser cutting tubes 26 that the seed potatoes 36 are cut into pieces prior to their being planted in the field. Finally, once the cutting process has been completed, the seed potatoes 36 fall out of the cutter housing lower opening 58, which is located at the terminal ends of the cutting tubes 26 and they are transported away from the invention by the lower conveyor apparatus 22 as described above.

Additionally, the cutter housing 20 is also equipped with a fan apparatus 62 which is used to keep the air within the cutter housing moving during operation. This is very important to the use of the invention as the cutting of organic material with a laser can produce smoke and debris which may inhibit the effective operation of the laser. The fan apparatus 62 can either be constructed to provide a positive pressure within the cutter housing 20 which would force the smoke out or to provide a negative pressure within the cutter housing which would serve to draw the smoke out. The movement of air created by the fan apparatus 62 eliminates the potential build up of smoke in the cutting area which enables the laser to function properly during all phases of operation of the present invention.

The basic manner of operation and the internal location of the laser beam 32 within the laser cutting tubes 26 of the present invention are illustrated in FIGS. 5 and 6. The small seed potato 36 falls into the laser cutting tube 26 (indicated by the direction of travel arrow 54) to the point at which it encounters the laser beam 32. The laser beam 32 is generated by the laser source 28 which itself is attached to the exterior and extends slightly inside of the laser cutting tube 26 at about the midpoint of the laser cutting tube 26. Thus, the laser source 28 projects the laser beam 32 through the center of the laser cutting tube 26 from one outside surface to the other. At the point at which the laser beam 32 contacts the other surface of the laser cutting tube 26 there is also located a conventional laser energy absorber 30. The laser energy absorber 30 serves to retain any unused laser energy to ensure that it is not released into the environment surrounding the invention where it could be a potential source of unwanted problems.

Therefore, as the seed potato 36 falls through the laser cutting tube 26, it comes into contact with the laser beam 32 that is bisecting the interior space of the laser cutting tube 26. The intense heat that is generated by the laser beam 32 quickly cuts through the seed potato 36 as it falls through the laser cutting tube 26 which effectively produces the cut seed potato 38 that is desired for potato field planting. Additionally, the use of the laser beam 32 for this purpose also has the effect of cauterizing the cut edges 60 of the seed potatoes 36 which eliminates the possibility of the spread of disease and bacteria between the seed potatoes 36 that are being processed by the present invention. This benefit of the invention greatly increases the productivity of a potato field as it helps eliminates a source of diseases that are common to other methods of cutting seed potatoes 36.

An alternative embodiment of the present invention in which a single laser source 28 is employed to produce a double cut seed potato 50 is illustrated in FIGS. 7 and 8. The dual beam seed potato cutter 40 uses a plurality of conventional reflecting mirrors 42 to direct the laser beam 32 back through the interior of the cutting tube 26 once it has initially passed through. This is accomplished by placing one of the reflecting mirrors 42 at a 45 degree angle directly opposite of the laser source 28. When the laser beam 32 strikes this reflecting mirror 42, it is deflected at a ninety degree angle to where it contacts a second reflecting mirror 42 which deflects it an additional ninety degrees so that it is now traveling in a direction that is one hundred eighty degrees from its initial line of travel. From this point, the laser beam 32 contacts a third reflecting mirror 42 which is oriented to deflect it an additional ninety degrees in a location so that it is directed back through the center of the laser cutting tube 26 just below or above the point at which it initially passed through the tube 26. This creates an X-type laser beam 32 configuration within the cutting tube 26 which produces a dual cut seed potato 50 which is useful when the operator desires to cut seed potatoes 36 into smaller size pieces for planting. Additionally, the cauterizing effect and benefits of the original embodiment are retained by the dual beam seed potato cutter 40.

A still further embodiment of the present invention in which a plurality of laser sources 28 are employed to produce multiple cut seed potatoes 36 is illustrated in FIGS. 9 and 10. It is this embodiment of the present invention which is employed to cut seed potatoes 36 that are either medium or large in size and that cannot fit through the laser cutting tubes 26. The horizontally fed multiple beam seed potato cutter 44 utilizes a laser cutting configuration that cuts the medium or large size seed potatoes 36 in their line of travel 54 as they come off the alignment rollers 18. Additionally, this embodiment uses a plurality of laser sources 28 that are arranged in this location to produce a grid of intersecting laser beams 32. This typically consists of a single horizontal laser beam 48 which bisects the horizontal field of travel of the seed potatoes 36 at a point that is just above the upper surfaces of the alignment rollers 18 and a plurality vertical laser beams 46 which divide the vertical field of travel of the seed potatoes 26. It is important to note that the configuration depicted here is simply for illustrative purposes and that virtually any configuration of the horizontal and vertical laser beams, 48 and 46, can be employed with this embodiment of the invention to obtain the desired cut patterns in the seed potatoes 36.

This embodiment of the present invention is also equipped with a plurality of laser energy absorbers 30 that are equal in number to the laser source 28 that are being used and are positioned in locations so they can contain any excess laser energy once it has passed through the seed potato 36 cutting zone. Finally, the embodiment of the invention is very useful in producing double cut seed potatoes 50 and triple cut seed potatoes 52 when the operator is using large seed potatoes 36 or desires to produce cut seed potatoes 38 of smaller and more uniform sizes.

The seed potatoes 36 are typically sized first before being sent through the various laser cutting tubes 26 or the potato alignment rollers 18. The laser cutting tubes 26 may then be arranged so that smaller seed potatoes would go through the laser cutting tubes 26 in FIG. 6 and larger ones would go through laser cutting tubes 26 which may be arranged as in FIG. 8. In FIGS. 9 and 10, the seed potatoes 36 would be sized. The smaller seed potatoes 36 would go through the laser cutting tubes 26 and the larger seed potatoes 36 would go through an arrangement as in FIG. 10 so that upon completion of the cutting with the laser the cut seed potatoes 38 are as uniform as possible.

Although the present invention has been described in considerable detail with reference to certain preferred versions thereof, other versions are possible. Therefore, the spirit and scope of the appended claims should not be limited to the description of the preferred versions contained herein.

What is claimed:

1. A method for preventing the spread of disease and of cutting seed potatoes for planting comprising the steps of:
   sizing seed potatoes for cutting into seed;
   supplying a chamber with a laser beam passing across said chamber;
   moving said seed potatoes through said laser beam; and
   cutting and cauterizing said seed potato with said laser beam.

2. The method of claim 1 wherein the smoke and debris from the laser cut are moved away from the laser by a fan.

3. The method of claim 2 wherein the termination point of said laser beam is supplied with a laser absorbing section.

4. The method of claim 3 wherein the laser beam is reflected back through said chamber so as to make a second cut on said seed potatoes.

5. The method of claim 3 wherein at least two lasers are used to make multiple cuts on said seed potatoes.

6. A cut seed potato produced by the method of claim 1.
7. A cut seed potato produced by the method of claim 2.
8. A cut seed potato produced by the method of claim 3.
9. A cut seed potato produced by the method of claim 4.
10. A cut seed potato produced by the method of claim 5.

11. A method for cutting seed potatoes for planting and preventing the spread of disease from one cut potato to another comprising the steps of:
    sizing seed potatoes for cutting into seed using a plurality of rollers;
    supplying a plurality of chambers with each chamber having at least one laser beam passing across said chamber;
    moving said sized seed potatoes to said appropriate chamber;
    passing said sized seed potato through said laser beam; and
    cutting and cauterizing said seed potato with said laser beam.

12. The method of claim 11 wherein the smoke and debris created from said laser cutting are moved away from the laser beam by a fan.

13. The method of claim 12 wherein the termination point of said laser beam is supplied with a laser absorbing section.

14. The method of claim 13 wherein the laser beam is reflected back through said chamber so as to make a second cut on said seed potatoes.

15. The method of claim 13 wherein at least two lasers are used to make multiple cuts on said seed potatoes.

16. A cut seed potato produced by the method of claim 11.

17. A cut seed potato produced by the method of claim 12.
18. A cut seed potato produced by the method of claim 13.
19. A cut seed potato produced by the method of claim 14.

20. A cut seed potato produced by the method of claim 15.

* * * * *